Patented June 21, 1932

1,863,945

UNITED STATES PATENT OFFICE

TSUNEJI SHIRAISHI, OF TATSUTA MURA, INBEN GUN, MIYE KEN, JAPAN

METHOD OF MANUFACTURING COLLOIDAL CARBONATE OF ALKALI EARTHS

No Drawing. Application filed July 31, 1930, Serial No. 472,210, and in Japan May 31, 1930.

The present invention relates to the method of manufacturing colloidal carbonate of alkali earths, which consists in making carbonic gas act upon milky liquor having specific gravity below 15° Baumé, which consists principally of oxides or hydroxides of alkali earths and is held below 35° C., so as to form basic carbonate in a rice-gruel-like or cream-like state; converting said basic carbonate into colloidal carbonate by passing carbonic acid therethrough; making it absorb "sol" or emulsion of organic material having great surface tension and then drying the same. The object thereof is to obtain fine colloidal particles of carbonate specially fit as filling material which diffuses in a pasty state and is distributed homogenerously without requiring any skill or complicated manipulation.

Now, when hydroxides of alkali earths are once converted into basic carbonate, they make the subsequent operations easy and also makes it easy to manufacture neutral colloidal carbonate. That is to say, if basic carbonate is employed as the raw material for colloidal carbonate, it will become colloidal even if the temperature in the reaction vessel exceeds 60 to 70° C., and even if the speed of reaction is very slow at the time. This invention utilizes the above fact ingeniously in a novel manner. The following is an example of performing it:—

A reaction vessel is filled with milky liquor of hydroxides of alkali earths having a specific gravity below 15° Baumé and concentrated carbonic acid gas is passed therethrough as rapidly as possible, while maintaining the temperature of the solution at 20° C. to 35° C. Then, excellent basic carbonate will be produced and the liquor will have its viscosity increased considerably to present a rice-gruel-like condition having a strong alkaline reaction. This phenomenon appears usually within 30 minutes after carbonic acid gas is introduced into the milky liquor used as the raw material. Then the liquor suddenly changes its condition and increases its viscosity considerably, rendering it impossible to estimate the specific gravity by hydrometer.

When carbonic acid is passed into the basic carbonate thus formed at a temperature from 40° C. to 80° C., after transferring the latter to another vessel, neutral colloidal carbonate will be obtained regardless of the concentration of gas and the speed of reaction. It may be immersed in the form of fine powder which is suspended in water or is in a wet condition, in colloidal solution ("sol") or emulsion of organic material having a great surface tension and causing it to absorb the latter. It may then be dried in such a manner that it is impregnated with 0.1-2% of said material. Thus, it is possible to obtain very brittle loose lumps, which, when mixed with pasty material, diffuse easily and are distributed uniformly by short kneading.

The colloidal solution or emulsion of organic material utilized in this invention refers to dilute water solution of soap, albumen, water-soluble gum resin like gum arabic or acacia, saponin, glue and agar or solution of resin, wax and fatty oil dissolved by organic solvents, or their emulsions.

Such solutions or emulsions are added to the above fine powder when it is dressed selectively by water or, when the fine powder is suspended in them in water or is mixed with them while still in a pasty state, before being dried, that is to say, while it is still wet. Then, they are mixed intimately by stirring so that the powder is thoroughly impregnated with the solution. The drying of the product then follows.

Claims:

1. Method of manufacturing neutral colloidal carbonate, which, in combination, consists in introducing concentrated carbonic acid gas as rapidly as possible into milky liquor principally consisting of hydroxides of alkali earth metals having a specific gravity below 15° Baumé, converting the said liquor into basic carbonate of rice-gruel-like state by keeping the temperature in the reaction vessel at from 20° to 35° C. and then treating the same with carbonic acid gas of the desired concentration at from 40° to 80° C.

2. Method of manufacturing neutral colloidal carbonate, which, in combination, consists in passing carbonic acid gas into milky liquor of hydroxides of alkali earths having a specific gravity below 15° Baumé and held at from 20° C. to 35° C. so as to form basic carbonate, then converting the latter into fine colloidal particles of carbonate by passing carbonic acid gas therein again, thereafter impregnating it with colloidal liquor of organic material having great surface tension, and finally drying the product.

3. The method of manufacturing neutral colloidal carbonate which, in a combined group of steps, consists in first providing a milky liquor containing a hydroxide of an alkali earth metal, said liquor having specific gravity below 15° Baumé, maintaining said liquor at a temperature ranging from 20° to 35° C., while passing concentrated carbonic acid gas into the same in order to form basic carbonate, then raising and maintaining the temperature of the liquor at from 40° to 80° C., while a second time introducing carbonic acid gas in order to convert the basic carbonate into finely divided particles of colloidal carbonate, thereafter associating said finely divided particles with a colloidal liquor containing organic material and having considerable surface tension, and finally drying said mixture to form the commercial product.

TSUNEJI SHIRAISHI.